United States Patent [19]

Rutan

[11] Patent Number: 5,975,464
[45] Date of Patent: Nov. 2, 1999

[54] AIRCRAFT WITH REMOVABLE STRUCTURAL PAYLOAD MODULE

[75] Inventor: Elbert Rutan, Mojave, Calif.

[73] Assignee: Scaled Composites, Inc., Mojave, Calif.

[21] Appl. No.: 09/158,186

[22] Filed: Sep. 22, 1998

[51] Int. Cl.[6] ...................................................... B64C 1/00
[52] U.S. Cl. ........................................ 244/120; 244/118.2
[58] Field of Search ................................ 244/120, 118.2, 244/137.1, 2

[56] References Cited

U.S. PATENT DOCUMENTS

| | | | |
|---|---|---|---|
| 2,388,380 | 11/1945 | Bathurst | 244/118.2 |
| 3,703,265 | 11/1972 | Iroitino | 244/120 |
| 4,379,533 | 4/1983 | Caldwell et al. | 244/120 |
| 4,736,910 | 4/1988 | O'Quinn et al. | 244/118.2 |
| 5,356,097 | 10/1994 | Chalupa | 244/118.2 |

*Primary Examiner*—J. Woodrow Eldred
*Attorney, Agent, or Firm*—Gregory Garmong

[57] ABSTRACT

An aircraft includes a forward fuselage segment, an aft fuselage segment, a wing structure supported from the aft fuselage segment, a tail structure supported from either the aft fuselage segment or the wing structure, and an engine supported from either the aft fuselage segment or the wing structure. A payload module is disposed between and connects the forward fuselage segment and the aft fuselage segment, so as to form the structural attachment between the forward fuselage segment and the aft fuselage segment. The payload module is disconnectable from the forward fuselage segment and the aft fuselage segment such that the forward fuselage segment and the aft fuselage segment are not connected to each other when the payload module is disconnected from the forward fuselage segment and the aft fuselage segment.

20 Claims, 7 Drawing Sheets

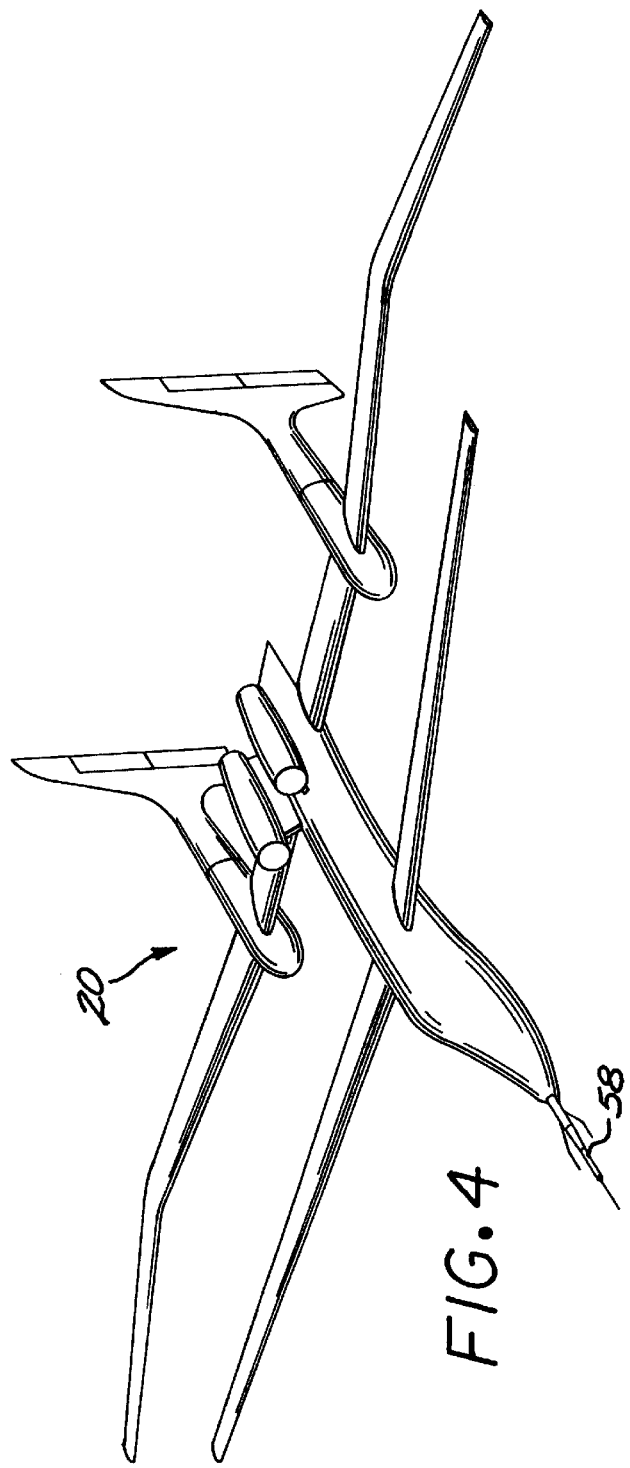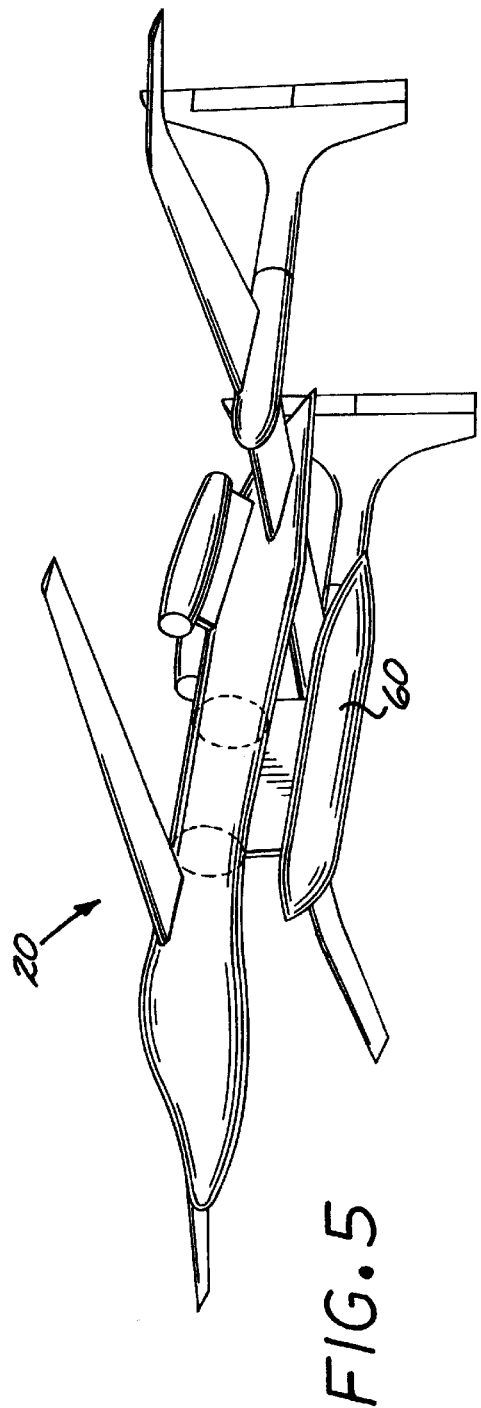
FIG. 4
FIG. 5

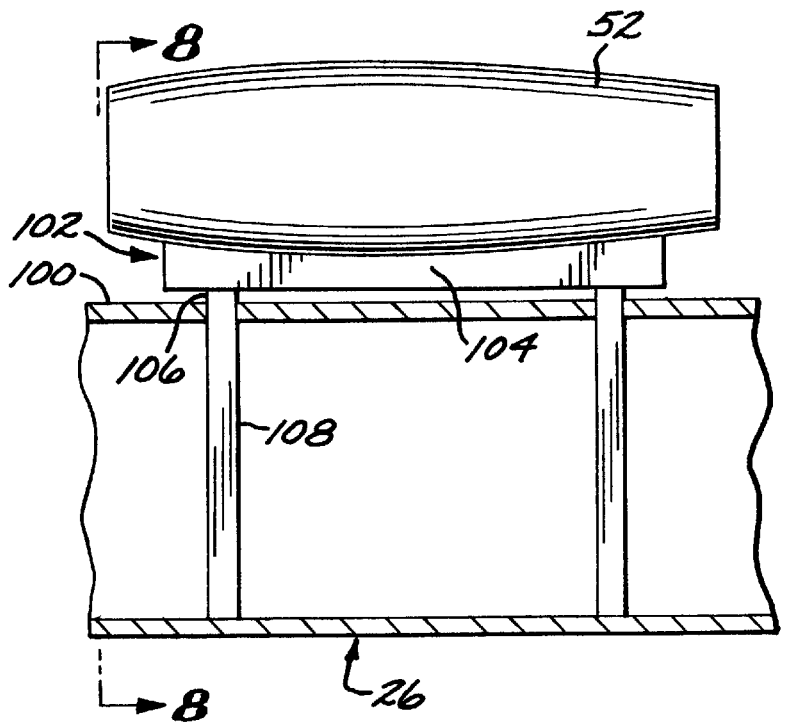
FIG. 7
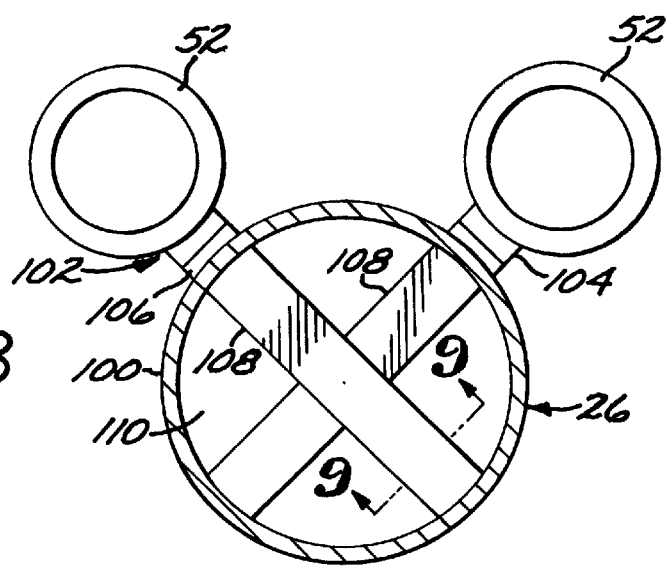
FIG. 8
FIG. 9

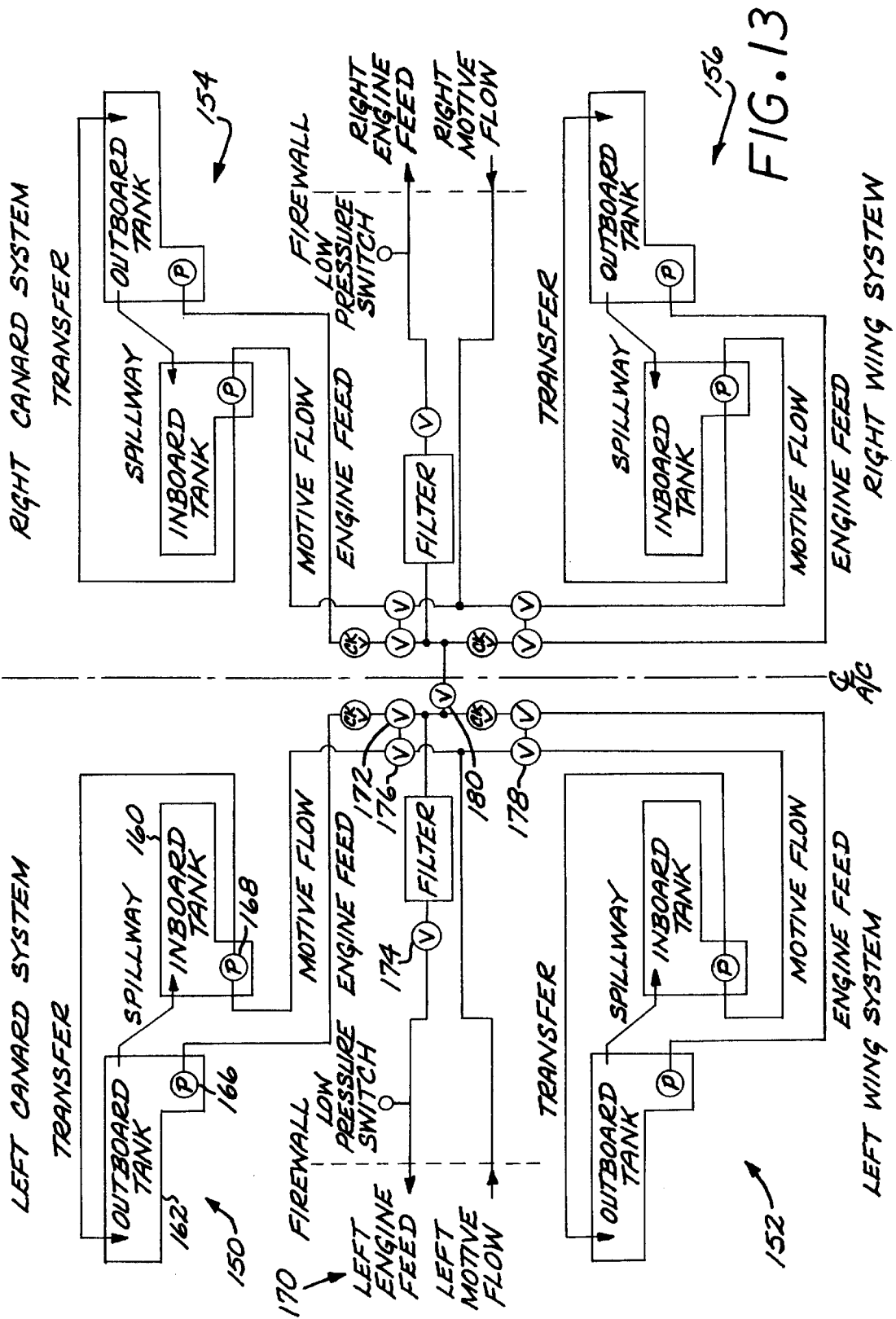

AIRCRAFT WITH REMOVABLE STRUCTURAL PAYLOAD MODULE

BACKGROUND OF THE INVENTION

This invention relates to the configuration and structure of an aircraft, and, more particularly, to an aircraft having a removable payload module that forms the structural link between a forward fuselage segment and an aft fuselage segment.

An aircraft structure includes a fuselage, a wing, a tail, and one or more engines mounted to the aircraft. A payload such as passengers or cargo is typically carried within the interior of the fuselage. In some cases, the payload may be mounted at least in part exteriorly to the fuselage or affixed externally to the wing.

Some aircraft are optimized for a single type of purpose or mission, such as carrying only passengers, carrying only cargo, or various specific military missions. In other cases, the aircraft is made so as to be convertible between various purposes in order to maximize the potential utilization of the aircraft. In one example, a "cargo conversion" aircraft is built so that the interior of the fuselage may be arranged with rows of passenger seats for some applications. The rows of seats are removable so that containers of cargo may be placed into the interior of the fuselage for other applications. In another example, used with aircraft such as bombers having an internal bay, various packages may be placed into the internal bay. In yet another example, interchangeable external pods may be attached to the airframe.

While operable in specific types of applications, these approaches to convertibility have limitations. If the various payloads are so complex that extensive modifications to the aircraft structure are required in order to effect the conversion, the switching between payloads becomes prohibitively costly and time consuming. For example, some payloads may require access to the exterior of the aircraft, as for instrumentation ports, while other payloads may require that a portion of the payload reside exteriorly to the aircraft. These widely varying types of payloads require that the aircraft undergo extensive modifications, such as adding instrumentation ports or external support pylons to accomplish the conversion. To reduce the cost and time required to make the conversion, the instrumentation ports or external support pylons may be provided as permanent parts of the aircraft structure, but any addition of permanent structure that is used only part of the time reduces the flight efficiency of the aircraft. Such a reduction in efficiency may be acceptable in some situations, but it is not acceptable for aircraft which are expected to perform challenging missions such as long loiter times at high altitudes, for several different types of payloads.

There is a need for an improved aircraft configuration which is both highly flexible as to the types of specialized payloads that it can carry, and is also highly efficient in operation. The present invention fulfills this need, and further provides related advantages.

SUMMARY OF THE INVENTION

The present invention provides an aircraft structure which is capable of operating with a wide variety of highly specialized payloads, and is efficient in flight. It may be converted between the types of payloads quickly and efficiently, and using the same procedures regardless of the type of payload being removed and the type of payload being added. The latter is important to minimize the training required for ground support personnel and the chances of error during conversion. The approach of the invention allows the aircraft to accommodate large external payloads. It also allows the aircraft to accommodate asymmetric internal or external payloads, and to operate in missions where the flight characteristics should be asymmetric. The preferred embodiment of the invention has been designed around a highly efficient aircraft having long loiter times at high altitudes.

In accordance with the invention, an aircraft comprises a forward fuselage segment, an aft fuselage segment, a wing structure supported from the aft fuselage segment, a tail structure supported from at least one of the aft fuselage segment and the wing structure, and an engine supported from one of the aft fuselage segment and the wing structure. A payload module is disposed between and connects the forward fuselage segment and the aft fuselage segment. The payload module forms the structural attachment between the forward fuselage segment and the aft fuselage segment. The payload module is disconnectable from the forward fuselage segment and the aft fuselage segment, such that the forward fuselage segment and the aft fuselage segment are not connected to each other when the payload module is disconnected from the forward fuselage segment and the aft fuselage segment.

In one embodiment, a disconnectable forward module attachment is disposed between the forward fuselage segment skin and the payload module skin, and a disconnectable aft module attachment is disposed between the aft fuselage segment skin and the payload module skin. With this arrangement, a first payload module may be easily disconnected and removed by first disconnecting any pass-through feeds, and then disconnecting the module structural attachments. A new payload module may be provided and built into the aircraft structure by reversing the procedure. To accomplish the swapping of payload modules, it is not necessary to modify the forward and/or aft fuselage structures.

In many instances, it is not sufficient simply that the payload modules be swappable. To ensure acceptable flight control characteristics for many missions and applications, the center of mass and the aerodynamic neutral point must bear a selected relationship to each other, both initially and throughout the flight. This selected relationship must be established for a variety of types of payloads used within the payload module, but without placing a portion of the payload into the forward or aft fuselage segments. For many missions, it is desirable that the center of mass be slightly forward of the aerodynamic neutral point, regardless of the payload. The center of mass of the aircraft may be moved according to the mass of the payload, and the presence of external payloads may affect the aerodynamic neutral point. The relative relationship of the locations of the center of mass and the aerodynamic neutral point must therefore be controllably adjustable to account for various payloads and the changes that occur during the course of a mission.

At least four techniques are used to establish and maintain the relative relationships of the center of mass and the aerodynamic neutral point in the present approach. First, the general aircraft configuration is selected to position the approximate locations of the center of mass and the aerodynamic neutral point within the volume defined by the payload module, so that payloads of different mass will have minimal effects in shifting the center of mass of the aircraft. Second, the preferred design includes a canard structure supported from the forward fuselage segment, which serves to shift the aerodynamic neutral point forwardly more than the center of mass is shifted. Third, extensions having selected aerodynamic properties may be added to either or both of the wings, and/or to either or both of the canards, prior to a flight. The wing and canard extensions slightly modify the center of mass, but they may have substantial effects on the aerodynamic neutral point, depending upon their type and size. The wing and canard extensions may be made readily switchable or removable. The fourth approach is to dynamically adjust the center of mass during flight by moving fuel around to different locations within the aircraft. In the preferred approach, the aircraft has fuel tanks in the forward and aft fuselage segments, as well as in the wing structure and the canard structure. As fuel is consumed during the flight, the remaining fuel is pumped from selected fuel tanks to other selected fuel tanks in order to adjust the center of mass of the remaining fuel, and thence the center of mass of the aircraft. If the payload application involves the use of consumables during the mission, the use of the payload consumables is taken into account in the fuel transfer.

The payload module is preferably attached to the forward and aft fuselage segments through their respective skin structures, minimizing the weight of internal connectors and other structure. The skin structures are desirably composite structures formed of advanced composite materials such as graphite or glass reinforcement embedded in a matrix of a thermosetting or thermoformable plastic. Sandwich structures having plies of the composite material over a foam core may also be employed. Any operable attachment between the forward segment skin and the payload module skin, and between the aft segment skin and the payload module skin, may be used. In one preferred approach, an attachment strap extends circumferentially around the fuselage, overlapping the payload module skin and the adjacent forward segment skin or aft segment skin. A plurality of removable fasteners affixes the attachment strap to the adjacent fuselage segment skin and to the payload module skin. An internal circular bulkhead may be provided in either the adjacent fuselage segment or the payload module, or both, to prevent their inward deformation and collapse under the loads imposed at the joint.

A number of pass-through feeds are provided between the forward and aft fuselage segments. Such feeds include, for example, fuel lines, hydraulic lines, pneumatic lines, cabin pressurization lines, control cables, and electrical/instrumentation leads. Appropriate disconnects are provided between these feeds at the forward segment/payload module and payload module/aft segment disconnect interfaces.

The present approach is distinct from the cargo conversion approach because an entire section of fuselage is changeable, not just structure within the interior of the fuselage. It is distinct from the use of an insert in an internal bay because the payload module forms the only structural connection between the forward and aft fuselage segments. It is distinct from "stretch" aircraft modifications, wherein the fuselage is cut and a new section permanently inserted, because the payload module of the present invention may be easily disconnected and switched. It is distinct from configurations using an external payload carrier because the payload module of the invention provides the structural connection between the forward and aft fuselage segments.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 4 is a perspective view of the aircraft of FIG. 1, with a payload module having an air sampling apparatus;

FIG. 5 is a perspective view of the aircraft of FIG. 1, with a payload module having an external reconnaissance pod;

FIG. 7 is a schematic combination elevational and sectional view of the aft fuselage section illustrating the mounting of the engines thereto;

FIG. 8 is a sectional view of the aft fuselage section, taken generally on line 8—8 of FIG. 7;

FIG. 9 is a sectional view of a support spar, taken along line 9—9 of FIG. 8;

FIG. 13 is a schematic diagram of the fuel storage and transfer system.

DETAILED DESCRIPTION OF THE INVENTION

Figure 1:
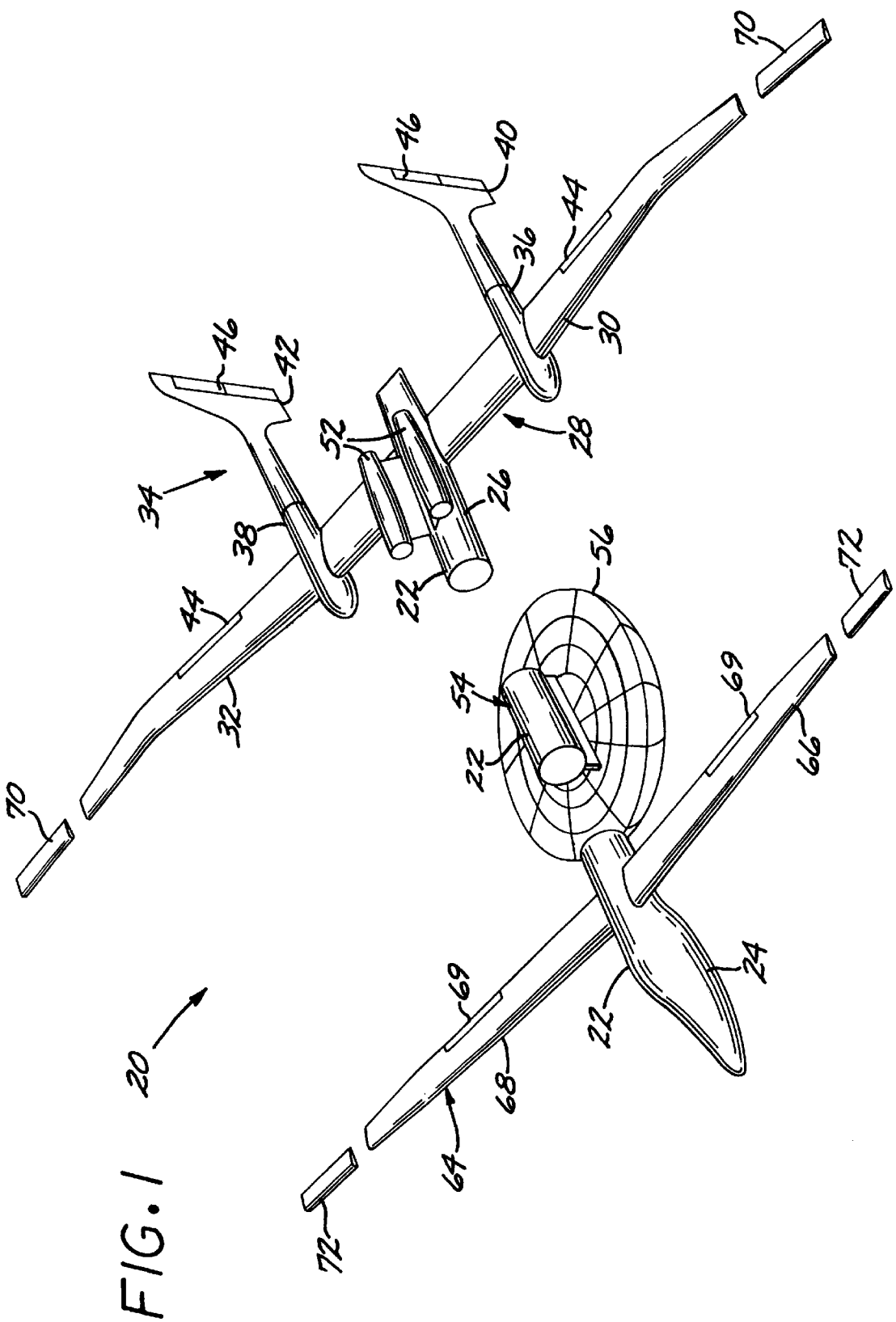
FIG. 1 is a perspective partially exploded view of an aircraft according to the invention, with a payload module having an external communications antenna.
Figure 2:
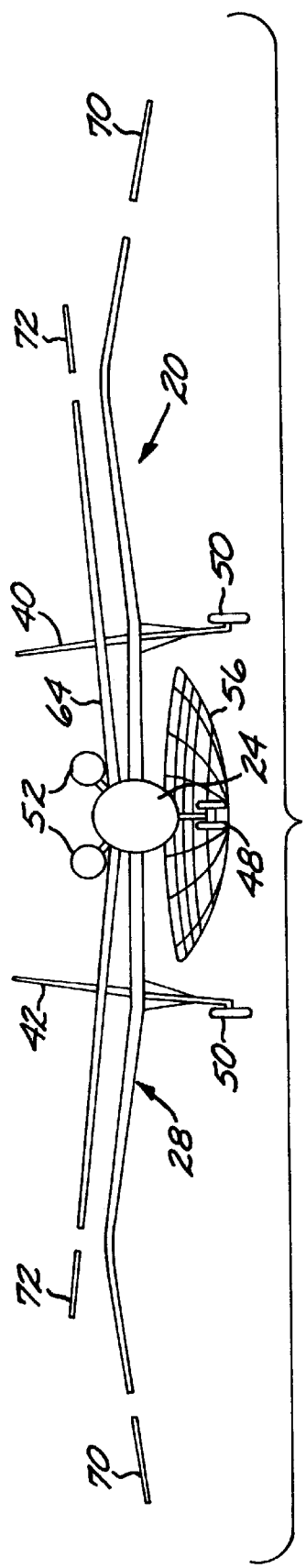
FIG. 2 is a front elevational view of the aircraft of FIG. 1.
Figure 3:
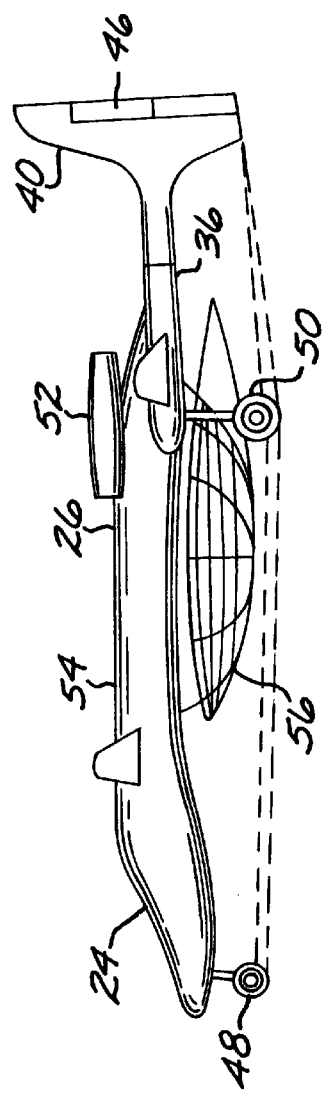
FIG. 3 is a side elevational view of the aircraft of FIG. 1.

FIGS. 1–3 illustrate the overall configuration of an aircraft 20 made according to the invention, with FIG. 1 being a partially exploded view that illustrates the modular construction of the aircraft. The aircraft 20 includes an elongated fuselage 22 with a forward fuselage segment 24 and an aft fuselage segment 26. The pilots, if any, are in the forward fuselage segment 24. A generally planar wing structure 28, including a left wing (viewed from above, facing the front of the aircraft) 30 and a right wing 32, is supported from the aft fuselage segment 26.

A tail structure 34 is supported from either the aft fuselage segment 26 or, in this preferred case, from the wing structure 28. The preferred tail structure 34 includes a left boom 36 supported from the left wing 30 and extending parallel to the fuselage 22 and a right boom 38 supported from the right wing 32 and extending parallel to the fuselage 22. A left vertical tail 40 is affixed to the aft end of the left boom 36, and a right vertical tail 42 is affixed to the aft end of the right boom 38.

The wing structure 28 has conventional movable aileron control surfaces 44 thereon, and the vertical tails 40 and 42 have conventional rudder control surfaces 46 thereon. As illustrated, the vertical tails 40 and 42, and their rudder control surfaces 46 extend above and below the plane of the wing structure 28 so that, when the rudder control surfaces 46 are activated, their center of pressure is approximately in the plane of the wing structure 28 and there is little tendency of the booms 36 and 38 to twist.

A front landing gear 48 is supported from and retractable into the forward fuselage segment 24, and two rear landing gear 50 are supported from and retractable into the left boom 36 and right boom 38, respectively.

Two engines 52, in this case small gas turbine (jet) engines, are supported from the upper side of the aft fuselage segment 26.

A payload module 54 is disposed between and connects the forward fuselage segment 24 and the aft fuselage segment 26. The payload module 54 forms the structural attachment between the forward fuselage segment 24 and the aft fuselage segment 26. The payload module 54 is disconnectable from the forward fuselage segment 24 and the aft fuselage segment 26 such that the forward fuselage segment 24 and the aft fuselage segment 26 are not connected to each other when the payload module 54 is disconnected from the forward fuselage segment 24 and the aft fuselage segment 26.

Figure 6:
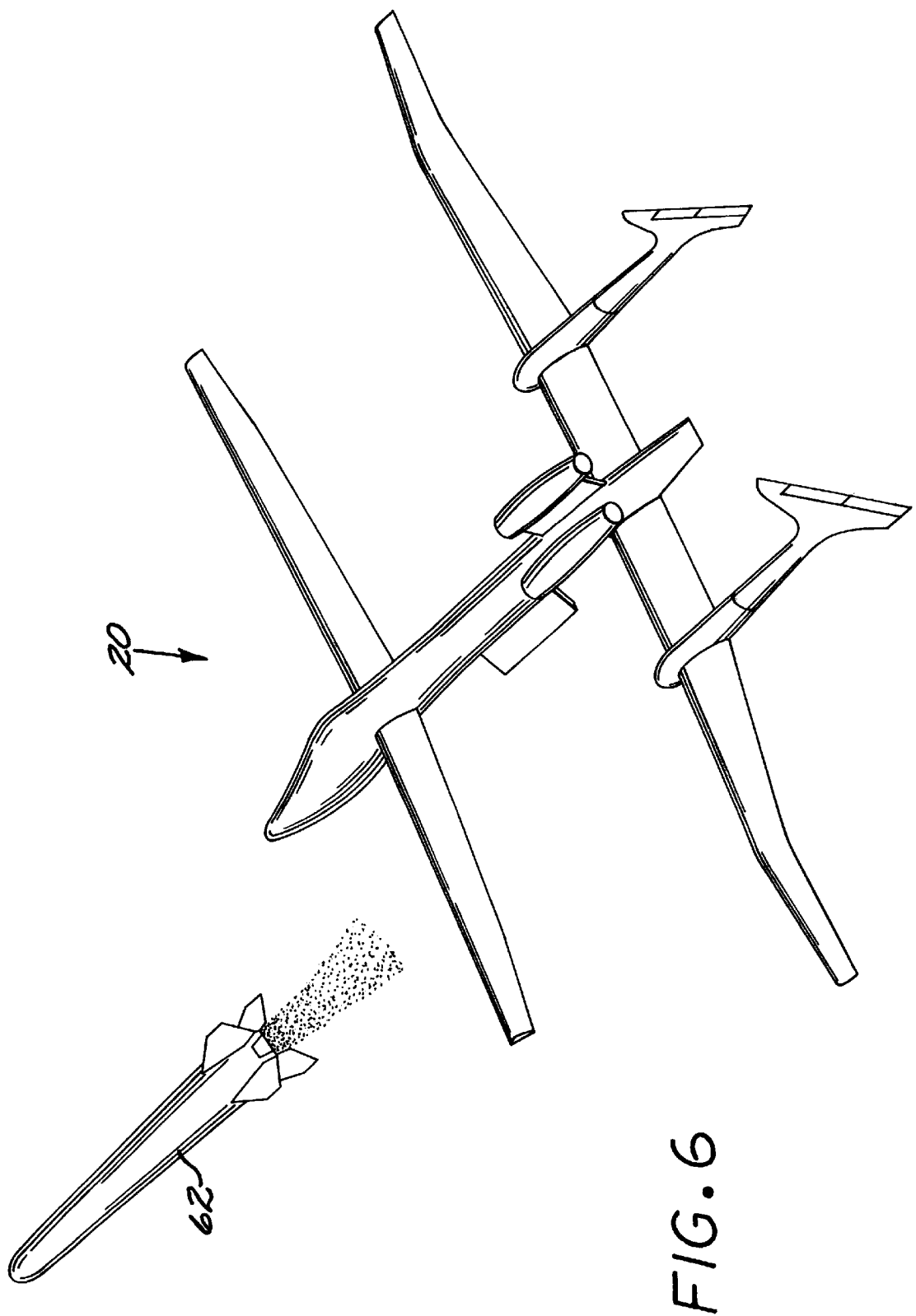
FIG. 6 is a perspective view of the aircraft of FIG. 1, with a payload module supporting and having just released an external launchable vehicle.

The payload module 54 may be adapted for any of a number of missions and functions. The payload module 54 of FIGS. 1–3 includes an external antenna 56 used in communications such as microwave telecommunications. In other missions, the payload module 54 includes, for example, air sampling apparatus supporting an air sampler 58 on the nose of the aircraft 20 (FIG. 4); a reconnaissance apparatus with an external reconnaissance pod 60 (FIG. 5); an externally attached launchable vehicle 62 that is flown to altitude and then launched (FIG. 6); and additional internal fuel tanks for extended range operations (any of FIGS. 1–6). Each of these applications requires a completely different configuration of the payload module 54, and includes internal electronics in addition to the externally visible structure. In the present approach, the different payload modules are readily interchanged on the basic aircraft 20, using the structure and approach to be discussed subsequently.

The preferred form of the aircraft 20 is designed to be compatible with large, downwardly extending external structures, such as shown in FIGS. 1–3, 5, and 6, supported from the payload module 54. The vertical tails 40 and 42, and their associated rudder control surfaces 46, are well separated laterally from the slipstream of such downwardly extending external structures. Additionally, as illustrated in FIG. 3, the fuselage 22 desirably has a "humpbacked" design wherein the portion of the payload module 54 attached to the forward fuselage segment 24 and the aft fuselage segment 26 is at a larger distance from the ground than the lowest point of the forward fuselage segment 24. This configuration gives a greater ground clearance for downwardly protruding external structures, at a cost of slightly longer rear landing gear 50. The engines 52 are mounted to the top side of the fuselage 22, so that their air intake and jet exhaust are not interfered by, and do not interfere with, a downwardly extending structure.

Optionally but desirably, a canard structure 64, having a left canard 66 and a right canard 68, is supported from the forward fuselage segment 24. The preferred canard structure 64 has controllable elevators 69 on the rear edge thereof to aid in pitch control of the aircraft.

The aircraft 20 is designed such that, apart from any consideration of the magnitude of the mass of the payload module 54, the center of mass of the aircraft is approximately in the volume occupied by the payload module 54. As used in this context, "approximately" means that care is taken to position the components contributing to the mass of the aircraft so that the center of mass is as close as possible to, and preferably within, the volume of the payload module 54. Active weight management systems to be discussed subsequently adjust the position of the center of mass as required. This mass balance is achieved by placing the pilots and most of the electronic control and support systems of the aircraft in the forward fuselage segment 24, as well as those fuel tanks located in the forward fuselage segment 24 and the canard structure 64. This forwardly positioned mass balances the mass of the aft fuselage segment 26, wing structure 28, tail structure 34, engines 52, and the fuel in tanks in the aft fuselage segment 26 and wing structure 28. When additional mass is added in the form of the payload of the payload module 54, the center of mass of the aircraft remains approximately in the region of the payload module 54. Also, the use of payload modules 54 of differing lengths does not move the center of mass away from the payload module.

The combination of the wing structure 28 and the canard structure 64 is provided to position the aerodynamic neutral point of the aircraft 20 at a location near to that of the center of mass. For most applications, it is desired that the center of mass and the aerodynamic neutral point be positioned relatively closely together—within a few feet—with the aerodynamic neutral point located slightly rearwardly of the center of mass for good aerodynamic control properties of the aircraft. As illustrated, the canard structure 64 is smaller than the wing structure 28, but is still relatively large in size compared to conventional canard structures on aircraft. In the preferred design, the canard structure 64 has a plan-view area of from about 50 to about 70, most preferably about 60, percent of that of the wing structure 28.

To adjust the lifting capacity and aerodynamic neutral point according to the nature of the payload carried within and on the payload module 54, modular wing extensions 70 may be added to the ends of the wing structure 28, and modular canard extensions 72 may be added to the ends of the canard structure 64. The wing extensions 70 and the canard extensions 72 have no control surfaces thereon or fuel storage therein, so that they may simply be attached to the ends of the wing structure 28 and the canard structure 64 without any services hookups.

To illustrate the use of the wing extensions 70 and canard extensions 72, if the center of mass of the aircraft (including the mass of the payload module 54) without any extensions is too far forward relative to the aerodynamic neutral point of the aircraft, the canard extensions 72 are added. The canard extensions 72 are sized and configured to provide proper additional lift to move the aerodynamic neutral point forwardly to a desired relationship relative to the center of mass. Adding wing extensions 70, in the absence of canard extensions, has the opposite effect of moving the aerodynamic neutral point rearwardly. In a presently preferred configuration, the wing structure 28 has a positive dihedral on the inboard section and a negative dihedral (anhedral) on the outboard section, as seen in FIG. 2. The wing extensions 70, when used, lengthen the outboard section at an anhedral. The canard structure 64 has a positive dihedral, and the canard extensions 70 elongate the canard structure 64 at the same positive dihedral. These relationships may, however, be changed as desired.

The wing extensions 70 and/or the canard extensions 72 may also be added in an asymmetric manner. That is, they may be added on one side of the aircraft but not the other, or different types and sizes may be added on the two sides of the aircraft. The effect of adding asymmetric wing extensions 70 and/or canard extensions 72 is to aerodynamically bias the aircraft during flight toward an asymmetric neutral flight state. In some missions, for example, the aircraft may have an asymmetric weight distribution (i.e., a lateral imbalance). This weight asymmetry may be aerodynamically balanced by using extensions 70 or 72 on the "heavy" side. Care is taken so that the asymmetry produced by this technique is not so great as to interfere with takeoff and landing operations.

The structural elements of the aircraft 20 are preferably made of composite materials, as will be discussed subsequently. The attachment and support of point loads, particularly those external to the fuselage such as the engines and structures supported external to the payload module, to a composite structure must be accomplished carefully. FIGS. 7–9 illustrate the preferred attachment of the external engines 52 to the composite fuselage 22, and a similar approach may be used to attach external loads to the payload module 54.

The aft fuselage segment 26 is made of a lightweight, thin composite material skin 100 in a generally cylindrical tubular construction. In a preferred embodiment, the total thickness of the skin 100 is about ½ inch. If the engine 52 were attached directly to this skin 100, the skin would quickly fail due to the imposed nearly point loadings. Instead, a pylon structure 102 is built to distribute the dead-weight and thrust loadings of the engines to the skin 100. The pylon structure 102 includes a load-distribution box 104 extending parallel to the fuselage 22, and the engine 52 is attached to the box 104 with threaded fasteners. A pylon 106 is attached to the box 104 near each of its ends. The pylon 106 extends through the skin 100 and is affixed to, preferably by an integral construction, an internal spar 108. There are two internal spars 108, one for each of the engines 52. The two internal spars 108 have a shallow C-section structure as shown in FIG. 9. The two internal spars 108 are affixed at their ends to the internal surface of the skin 100, and at their approximate midpoints to each other in a back-to-back fashion of the C-shaped spars. This X-shaped spar structure (FIG. 8) with the attached box 104 distributes the circumferential and longitudinal loads of the engine 52 into the skin 100 over a large surface area. The open areas 110 between the spars 108 and the internal surface of the skin 100 provide passageways within which pass-through feeds are conducted.

The payload module 54 is joined to the forward fuselage segment 24 and the aft fuselage segment 26 by a structural attachment that transmits the structural loadings through the aircraft 20. Any operable approach may be used, but the selected approach must permit both the structural connection and a readily easy structural disconnection when desired to remove the payload module. The structural attachment should also be as light in weight as is consistent with its load transmission function.

Figure 10:
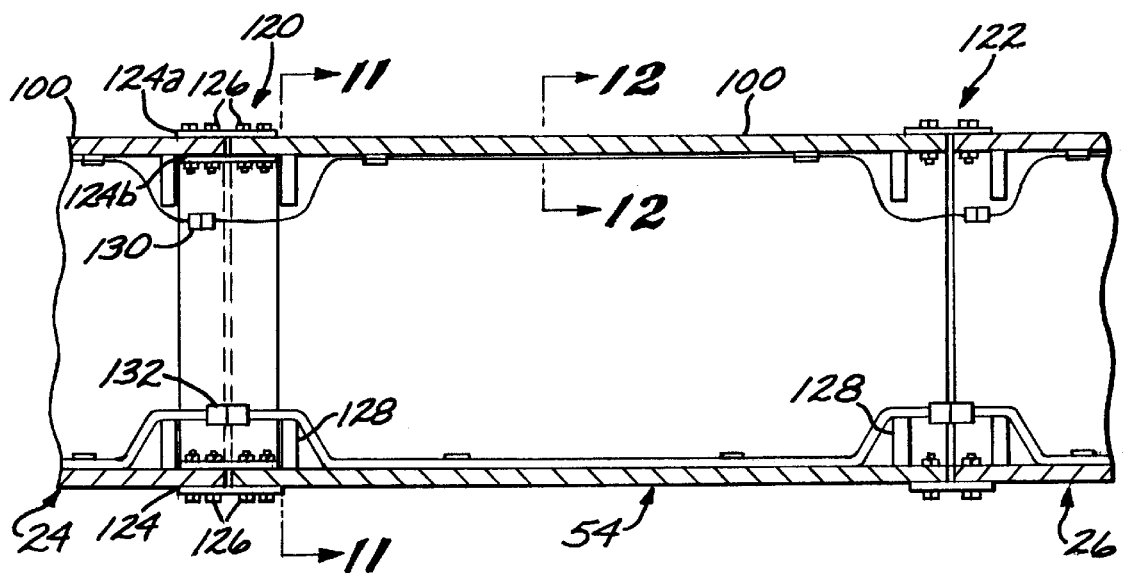
FIG. 10 is a schematic elevational sectional view of the payload module and the longitudinally adjacent fuselage segments, illustrating the attachment therebetween.
Figure 11:
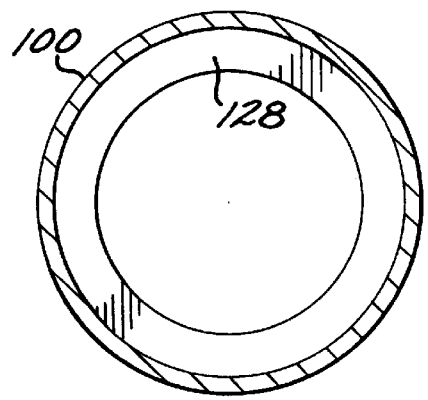
FIG. 11 is a sectional view of the payload module, taken generally on line 11—11 of FIG. 10.

FIGS. 10–11 illustrate a preferred approach to a forward module attachment 120 between the forward fuselage segment 24 and the payload module 54, and to an aft module attachment 122 between the aft fuselage segment 26 and the payload module 54. Only the forward module attachment 120 will be described, but it is understood that the aft module attachment 122 is similar in structure.

To attach the forward fuselage segment 24 and the payload module 54 together, their ends are placed into an abutting and facing relationship, as shown in FIG. 10. The forward module attachment 120 includes a forward attachment strap 124 made of a composite material such as fiberglass extending circumferentially around the surface of the skin 100 of the ends of both the forward fuselage segment 24 and the payload module 54. Preferably, there are a matched external strap 124a and internal strap 124b, in a facing relationship with the skin 100 therebetween. Matching fastener holes are provided in the forward attachment straps 124 and the skin 100 of each of the forward fuselage segment 24 and the payload module 54. Fasteners such as bolts 126 are placed through the fastener holes and fastened with nuts. These fasteners 126 are loaded in double shear due to the use of the two straps 124a and 124b. FIG. 10 shows the preferred use of a double row of fastener bolts 126 between the forward attachment straps 124 and the skin 100 of the forward fuselage segment 24, and another double row of fastener bolts 126 between the forward attachment strap 124 and the skin 100 of the aft fuselage segment 26. Single rows of bolt fasteners may be used instead, but the double row approach is preferred. The attachment strap and the bolt heads extend into the airstream, but the boundary layer at the external surface of the skin 100 at this intermediate location along the length of the fuselage prevents excess drag associated with the configuration. If drag is found to be a problem, the attachment strap and the bolt heads may be recessed, but initial indications are that the illustrated configuration is acceptable from a drag standpoint.

A similar attachment structure is preferably used at the aft module attachment 122.

The loading of the attachment straps 124 produces a radially inwardly loading tending to crush the tubular skin 100 of the fuselage 22. To prevent such crushing, a circular bulkhead 128 is provided in each of the forward fuselage segment 24, the aft fuselage segment 26, and the payload module 54, at locations adjacent to the disconnectable attachments 120 and 122, see FIGS. 10 and 11. The circular bulkhead 128 is made of composite material integrally joined to the internal surface of the skin 100.

Numerous services must be passed through the payload module 54 between the forward fuselage segment 24 and the aft fuselage segment 26. Such services include tubular lines for fuel, hydraulic pressure, pneumatic pressure, and cabin pressurization, mechanical lines to transmit control forces to the control surfaces 44 and 46, and electrical and instrumentation wires and wire bundles. As noted before, the X-shaped spar structure used to support loads from the skin 100 of the fuselage includes open areas 110 that pass such services. Conventional quick disconnects are provided for the tubular lines, the electrical lines, and the mechanical lines at each end of the payload module 54. Two exemplary disconnects, an electrical disconnect 130 and a tubular disconnect 132, are illustrated in FIG. 10, but additional disconnects are provided as necessary. The tubular lines and electrical lines are affixed to the interior of the skin 100 with conventional Click-bond™ fasteners.

To attach the payload module 54 between the forward fuselage segment 24 and the aft fuselage segment 26, these elements are arranged as shown in FIG. 10 using assembly jigs (not shown). A worker crawls inside the fuselage 22 through an access port (not shown), and, in cooperation with a worker outside the fuselage 22, aligns the attachment straps 124 and the fastener bolts 126, and attaches the corresponding nuts to the bolts. The worker inside the fuselage 22 connects all of the quick disconnects, and then crawls out of the fuselage. The payload module 54 is disconnected by reversing these steps. In connecting and disconnecting the elements of the fuselage, the workers need have no knowledge of the details of the payload, and the connecting and disconnecting procedures are the same regardless of the nature of the payload.

If the payload module includes an externally supported structure such as shown in FIGS. 1–3 and 5–6, the same type of spar structure discussed previously in relation to FIGS. 7–9 is preferably used.

Figure 12:
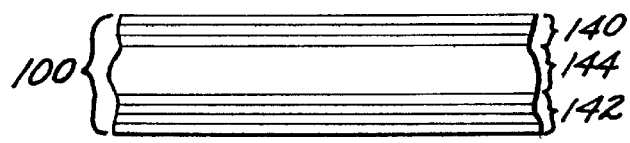
FIG. 12 is an enlarged sectional view of the skin of the payload module, taken generally along lines 12—12 of FIG. 10.

The skin 100 of the aircraft 20 is preferably of any operable composite construction. For example, the composite may be laid up as a plurality of facing plies or wrapped using winding procedures. A preferred construction for all of the skin structure is shown in FIG. 12. An outer skin 140 includes one or more layers (plies) of cured composite material, and an inner skin 142 also includes one or more layers of cured composite material. The cured composite material is preferably graphite or glass fibers in a thermosetting polymeric matrix such as an epoxy. Such composite materials are available commercially as single plies. A core 144 is sandwiched between the outer skin 140 and the inner skin 142. The core 144 is preferably a foam material such as a syntactic foam. This skin 100 is constructed in a progressive layup fashion by collating the plies of the inner skin 142 onto a form, collating the material of the foam core 144 overlying the inner skin 142, and collating the plies of the outer skin 140 overlying the foam core 144. The assembly is consolidated and cured by a heating and compaction procedure recommended for the polymeric matrix material.

The numbers, types, and arrangements of the plies of the composite material do not form a part of the present invention, and are determined by the detailed design requirements of the aircraft. The numbers, types, and arrangements may be varied at different locations in the aircraft responsive to the loadings experienced at those locations. For example, additional layers of longitudinally oriented uniaxial reinforcement may be provided along the upper and lower regions of the fuselage to produce a stiffened spine to carry loadings.

The heaviest consumable of a typical mission of the aircraft 20 of the invention is fuel. The consumption of fuel tends to change the center of mass and thence the flight characteristics of the aircraft, unless care is taken to manage the fuel to avoid large shifts in the center of mass. To accomplish the fuel management, a plurality of fuel tanks are provided throughout the fuselage 22, the wing structure 28, and the canard structure 64 of the aircraft.

FIG. 13 schematically illustrates the location of the fuel tanks and pumps used to shift fuel around the aircraft during the course of a mission, in order to maintain the center of mass at a selected location. There are four fuel storage locations, a left-canard storage 150, a left-wing storage 152, a right-canard storage 154, and a right-wing storage 156. (Fuel tanks within the fuselage 22 may also be provided and managed in a similar manner to that described subsequently.) Each of the storages 150, 152, 154, and 156 is schematically the same, and the left-canard storage 150 will be discussed as exemplary. The left-canard storage 150 includes a left-canard inboard tank 160 and a left-canard outboard tank 162. Fuel flows by gravity through a spillway 164 from the left-canard outboard tank 162 to the left-canard inboard tank 160. The sump of the left-canard outboard tank 162 feeds a controllable electric fuel pump 166 that pumps fuel to the engine. The sump of the left-canard inboard tank 160 feeds a controllable jet fuel pump 168 that pumps fuel from the left-canard inboard tank 160 to the left-canard outboard tank 162. Fuel may thereby be circulated between the left canard inboard tank 160 and the left-canard outboard tank 162 for mass and thermal control purposes. By depleting the inboard fuel first, the fuel load remains outboard where it is more directly supported by the wing lift. Fuel from the left-canard outboard tank 162 is pumped by the electric fuel pump 166 to the left engine 170 through an electrically controlled variable feed valve 172 and a firewall shutoff valve 174. Excess fuel from the left engine 170 flows back to the left-canard inboard tank 160 through an electrically controlled variable return valve 176.

However, excess fuel flow from the left engine 170 need not be returned to the tank storage from which is was drawn. By coordinating the operation of the valve 176 and a similar variable return valve 178 for the left-wing storage 152, excess fuel may be returned to either the left-canard storage 150 or the left-wing storage 152. The left-side forward-to-rear mass distribution of the aircraft may thereby be controlled by the movement of fuel between the left-canard storage 150 and the left-wing storage 152. Similarly, the right side forward-to-rear mass distribution may be controlled by the movement of fuel between the right-canard storage 154 and the right-wing storage 156. In normal operation, fuel from the left-side storage feeds the left engine, and fuel from the right-side storage feeds the right engine. However, an electrically controlled crossflow valve 180 is provided to allow cross feeding of fuel for emergencies or for side-to-side adjustments of mass.

The present invention thus provides an aircraft with a readily interchangeable payload module and with good aerodynamic properties. The aircraft is light in weight and has a low fuel consumption rate, so that it has a long loiter time at high altitudes.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An aircraft, comprising:
   a forward fuselage segment;
   an aft fuselage segment;
   a wing structure supported from the aft fuselage segment;
   a tail structure supported from at least one of the aft fuselage segment and the wing structure;
   an engine supported from one of the aft fuselage segment and the wing structure; and
   a payload module disposed between and connecting the forward fuselage segment and the aft fuselage segment, the payload module forming the structural attachment between the forward fuselage segment and the aft fuselage segment, and further being disconnectable from the forward fuselage segment and the aft fuselage segment such that the forward fuselage segment and the aft fuselage segment are not connected to each other when the payload module is disconnected from the forward fuselage segment and the aft fuselage segment.

2. The aircraft of claim 1, wherein the center of gravity of the aircraft lies within the payload module.

3. The aircraft of claim 1, wherein the aerodynamic neutral point lies within the payload module.

4. The aircraft of claim 1, further including
   at least one wing extension, each wing extension being mounted to an end of the wing structure.

5. The aircraft of claim 1, further including
   a canard structure supported from the forward fuselage segment.

6. The aircraft of claim 5, further including
   at least one canard extension, each canard extension being mounted to an end of the canard structure.

7. The aircraft of claim 1, wherein
   the forward fuselage segment has a forward fuselage segment skin,
   the aft fuselage segment has an aft fuselage segment skin, and the payload module has a payload module skin, and wherein the payload module skin is structurally attached to the forward fuselage segment skin and to the aft fuselage segment skin when the payload module is connected between the forward fuselage segment and the aft fuselage segment.

8. The aircraft of claim 1, further including
at least one forward fuel tank located in the forward fuselage segment, and
at least one aft fuel tank located in one of the aft fuselage segment and the wing structure.

9. The aircraft of claim 1, wherein the payload module includes at least one payload module services conduit therethrough, and further including
a forward services interconnect between the forward fuselage segment and the at least one payload module services conduit, and
an aft services interconnect between the aft fuselage segment and the at least one payload module services conduit.

10. The aircraft of claim 1, wherein the payload module comprises a payload selected from the group consisting of a communications antenna, an air sampling device, a reconnaissance device, a launchable vehicle, and a payload module fuel tank.

11. The aircraft of claim 10, wherein the payload module has a payload module skin, and at least a portion of the payload is mounted externally to the payload module skin.

12. An aircraft, comprising:
a forward fuselage segment having a forward fuselage segment skin;
an aft fuselage segment having an aft fuselage segment skin;
a wing structure supported from the aft fuselage segment;
a tail structure supported from at least one of the aft fuselage segment and the wing structure;
an engine;
an engine support disposed between and connecting the engine and one of the aft fuselage segment and the wing structure;
a payload module disposed between the forward fuselage segment and the aft fuselage segment and having a payload module skin;
a disconnectable forward module attachment disposed between the forward fuselage segment skin and the payload module skin; and
a disconnectable aft module attachment disposed between the aft fuselage segment skin and the payload module skin.

13. The aircraft of claim 12, wherein the forward module attachment comprises
a forward attachment strap extending circumferentially around the forward fuselage segment and overlapping the forward fuselage segment skin and the payload module skin, and
a plurality of removable fasteners affixing the forward attachment strap to the forward fuselage segment skin and to the payload module skin.

14. The aircraft of claim 12, wherein the engine support connects the engine to the aft fuselage segment, and wherein the engine support comprises
an internal bracing structure within the aft fuselage segment, and
a pylon structure extending through the aft fuselage segment skin, the pylon structure being affixed at a first end to the internal bracing structure and affixed at a second end to the engine.

15. The aircraft of claim 12, wherein the forward fuselage segment skin, the aft fuselage segment skin, and the payload module skin each comprises a composite material.

16. The aircraft of claim 12, wherein the forward fuselage segment skin, the aft fuselage segment skin, and the payload module skin each comprises an outer layer of a first composite material, an inner layer of a second composite material, and a core bonded between the outer layer and the inner layer.

17. An aircraft, comprising:
a forward fuselage segment;
a canard structure supported from the forward fuselage segment. an aft fuselage segment;
a wing structure supported from the aft fuselage segment, the wing structure including a left wing and a right wing;
a tail structure supported from the wing structure, the tail structure comprising
a left boom supported from the left wing,
a left vertical tail supported from the left boom,
a right boom supported from the right wing, and
a right vertical tail supported from the right boom;
at least one engine supported from the aft fuselage segment; and
a payload module disposed between and connecting the forward fuselage segment and the aft fuselage segment, the payload module forming the structural attachment between the forward fuselage segment and the aft fuselage segment, and further being disconnectable from the forward fuselage segment and the aft fuselage segment such that the forward fuselage segment and the aft fuselage segment are not connected to each other when the payload module is disconnected from the forward fuselage segment and the aft fuselage segment.

18. The aircraft of claim 17, wherein the center of gravity of the aircraft and the aerodynamic neutral point of the aircraft each lie within the payload module.

19. The aircraft of claim 17, further including
at least one wing extension, each wing extension being mounted to an end of the wing structure.

20. The aircraft of claim 17, further including
at least one canard extension, each canard extension being mounted to an end of the canard structure.

* * * * *